Nov. 7, 1967  G. DUFFAU  3,351,234
DEVICES FOR SEPARATING AND HANDLING STOPPERING
OR CAPPING CAPSULES
Filed April 15, 1966  4 Sheets-Sheet 1
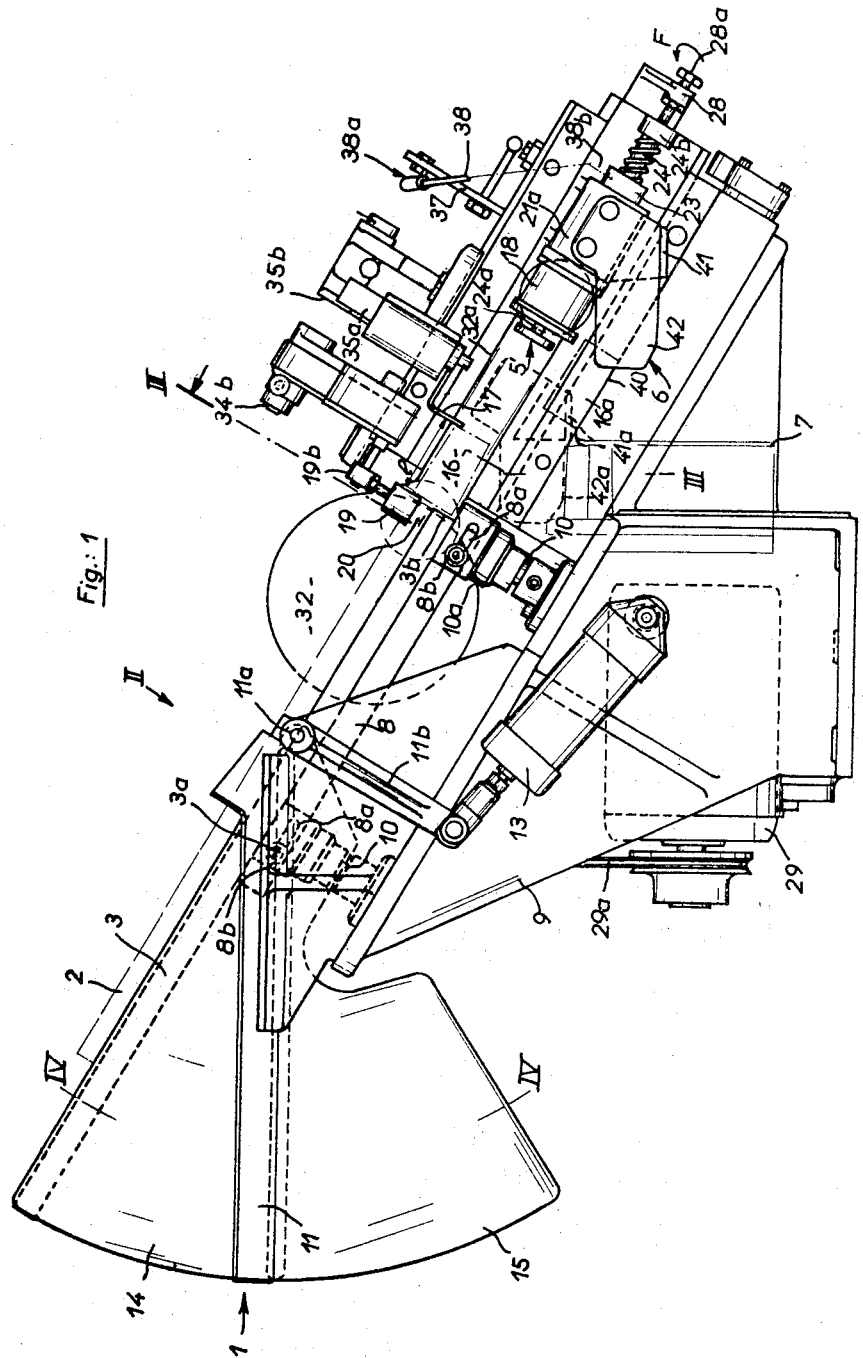
Fig.:1

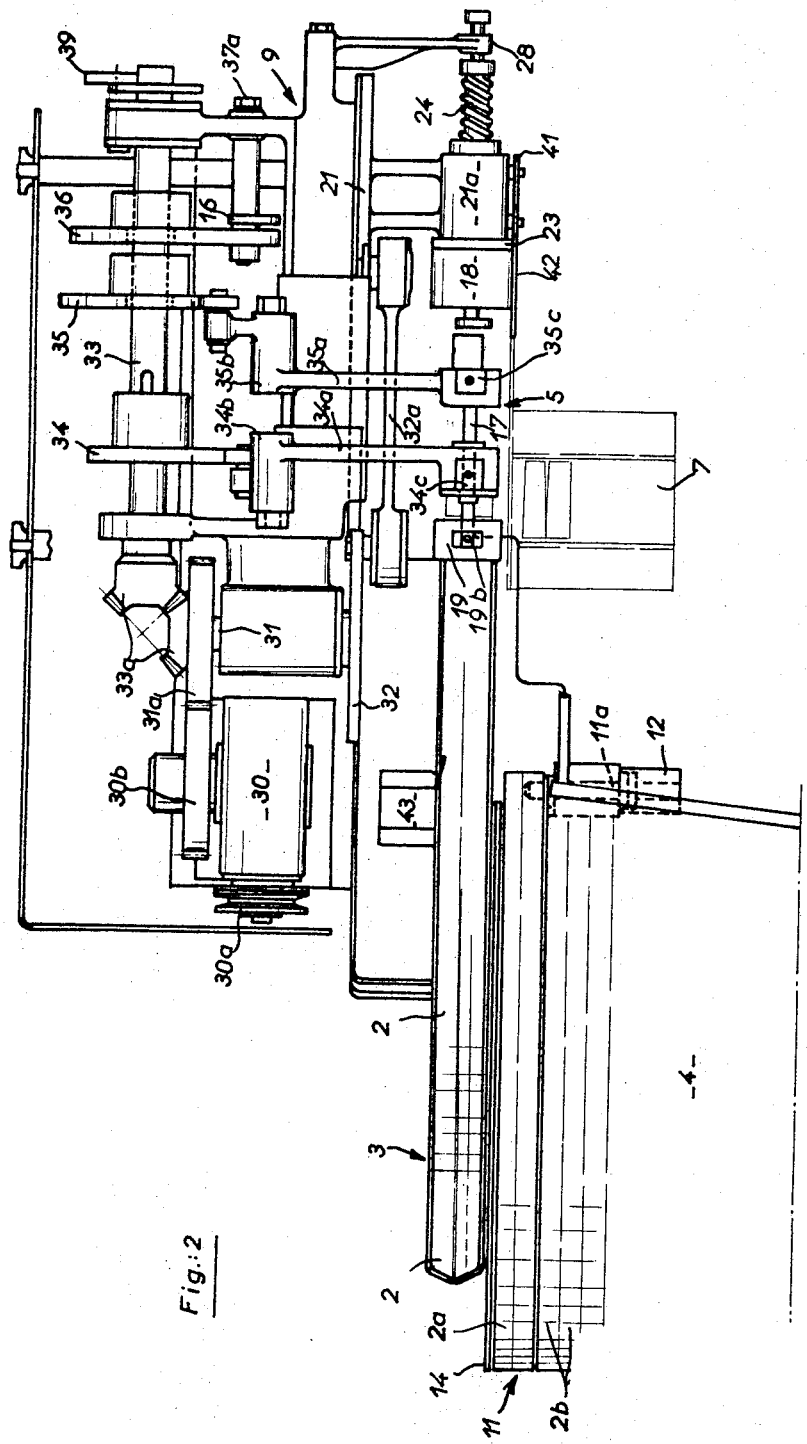
Fig.:2

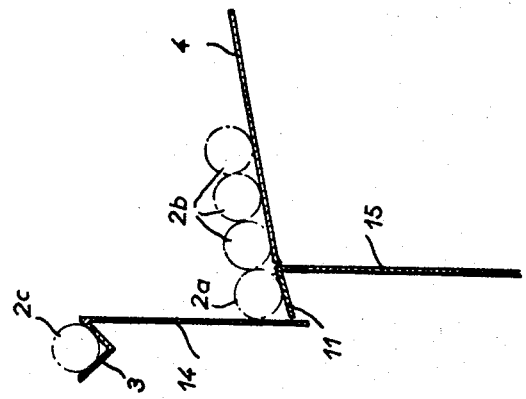
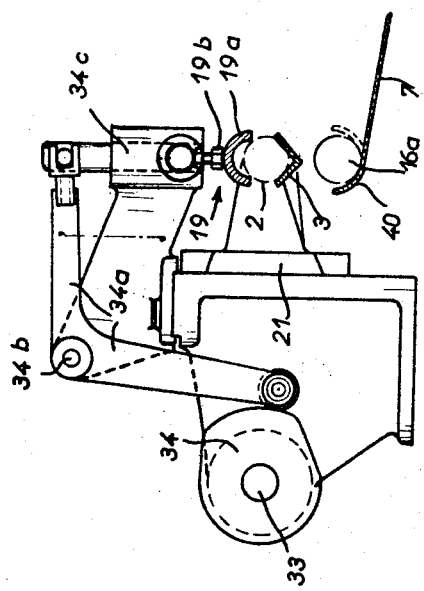

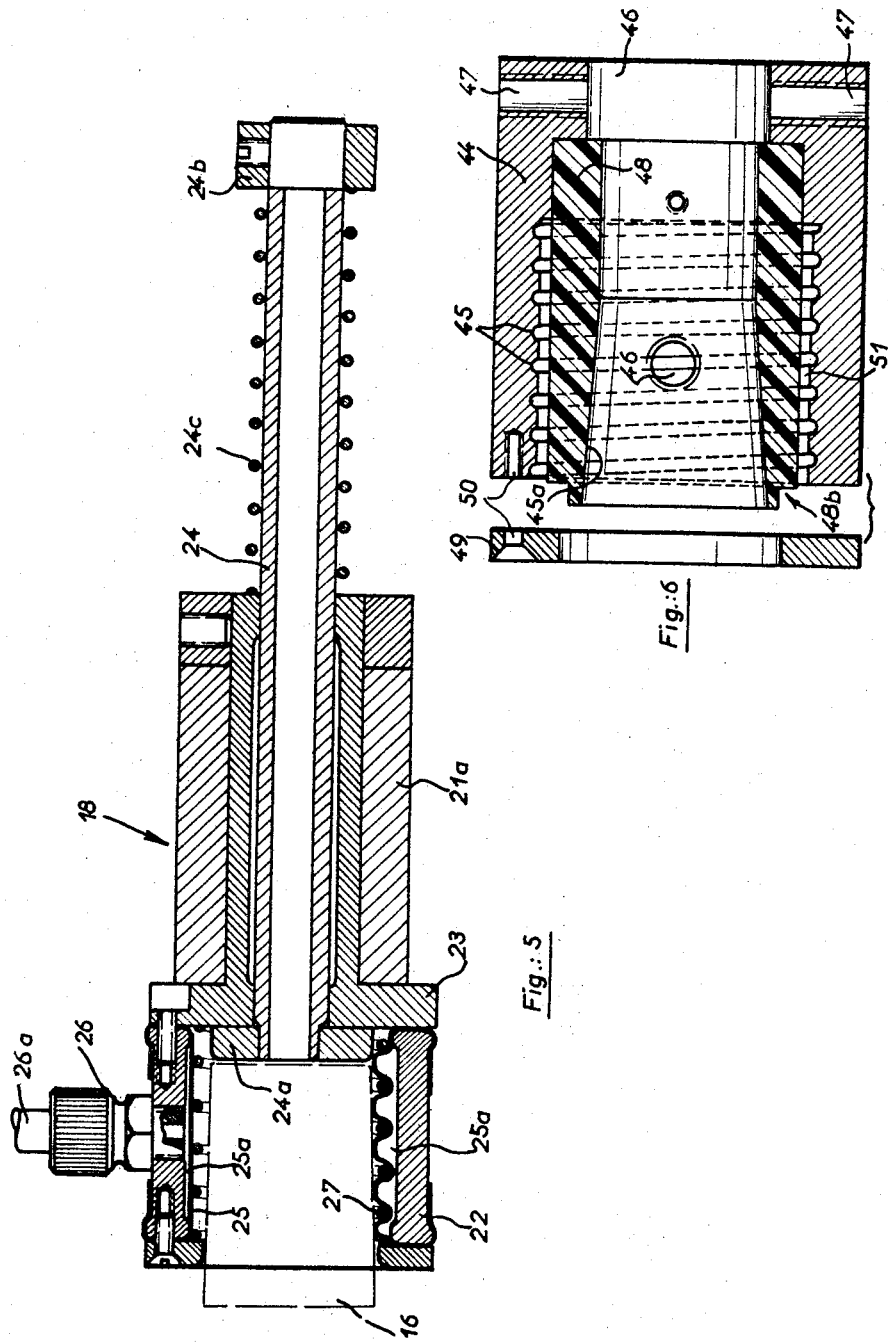

United States Patent Office 3,351,234
Patented Nov. 7, 1967

3,351,234
DEVICES FOR SEPARATING AND HANDLING STOPPERING OR CAPPING CAPSULES
Georges Duffau, Le Bouscat, France, assignor to Trefimetaux, Paris, France, a company of France
Claims priority, application France, Apr. 16, 1965, 13,615
Filed Apr. 15, 1966, Ser. No. 542,931
13 Claims. (Cl. 221—220)

ABSTRACT OF THE DISCLOSURE

A device applicable to the separation from each other of individual capsules which are stacked in telescoping relationship with each other to form a "stick," the device comprising a resiliently deformable elastic sleeve member which is adapted to either envelop the outer surface of the capsule or be fitted within the capsule and to correspondingly expand against the adjacent capsule wall to thereby grip same.

---

This invention relates to the sealing of bottles, flasks and the like containers by means of stoppering or capping capsules and has for its object to provide improved means of separating and handling such capsules before they are fitted to the containers.

Stoppering and capping capsules are well known. They can be made of any kind of material (tinned lead, aluminium, paper, aluminium-paper or aluminium-polythene complexes, etc.) and can be manufactured in any convenient way, notably by pressing or gluing.

The capsules are offered up in "sticks," i.e. in the form of stacks of, say, 50 or 100 capsules fitted into one another, and must be separated from the stick one by one and deposited at the work station where the stoppering or capping is to be carried out.

In accordance with the present invention, these separating and depositing operations are performed mechanically by means of a device comprising a reciprocating gripping head equipped with a deformable wall engaging over or into the first capsule and exerting a limited pressure on on the wall thereof, thereby to rigidly unite it with said gripping head which is then caused to move away from the stick in a translating motion preferably accompanied by a rotating motion whereby to detach said capsule at the same time as a pressure is exerted on the wall of the next capsule to retain it on the stick. The pressure exerted by said deformable gripping head wall on the first capsule is then released and the capsule extracted from the head (by means for instance of a member adapted to slide relatively thereto). The extracted capsule is then conveyed to the work station, and the gripping head returns to detach the next capsule from the stick.

In one specific form of embodiment, the deformable gripping head wall is an elastic diaphragm which deforms in response to a pressure, and this deformation is limited by one or more elements jointly forming a discontinuous abutment, an example being a metal wire wound into a helix after the fashion of a coil spring. Upon being elastically deformed responsively to such a pressure, said diaphragm presses against the capsule between said elements. For exemplary purposes, the internal wall of the gripping head may, in its inoperative configuration, have a volume greater than that of the capsule. This wall exerts adjustable pressure against the outside of the capsule, responsively to a compressed fluid, a spring, or any convenient mechanical device which reduces its volume, thereby permitting disengagement. When this action ceases, the clearance between the capsule and the internal wall of the gripping head is restored, so that the capsule can easily be ejected.

In an alternative constructional form, the internal wall of the gripping head is made of an elastic material and in its inoperative configuration bounds a volume somewhat smaller than that of the capsule to be disengaged. To enable the gripping-head to engage over the capsule, its inner volume is increased under the action of a negatively pressurized fluid, a spring or any convenient mechanical device. When this action ceases, the wall presses against the outside of the capsule with a pressure dependent at once on the elasticity of the material and the relationship between said interior wall and the exterior of the capsule. Disengagement then takes place, and when it is desired to detach the disengaged capsule from the gripping head, the negatively pressurized fluid, the spring or the mechanical device is rendered effective once more.

The present invention likewise relates to apparatus for correctly discharging capsules conveyed in succession by a reciprocating member which may be said gripping head. Said apparatus includes guide means on to which each capsule is transferred, preferably under gravity, after having been conveyed by said member during the forward motion thereof. The capsule is then carried along during the return motion of said member up to a waiting position facing a discharge passage masked by an element which retracts during the return motion of said member. The capsule can then be discharged conveniently (on to an inclined slab for example) through said passage, which remains open until the conveying member returns. Obviously, the waiting position must be well clear of the path followed by the conveying member in order not to hinder operations on the next capsule.

In machines for separating such capsules, the stick is usually placed in a chute or other sloping guidance means, down which it moves under gravity as the capsules are detached. Such guidance means can be supplied with capsule sticks by means of a system which includes a cradle normally positioned horizontally and receiving transversely the first stick in a row thereof placed on a sloping table, and means for fetching this cradle, by a swinging motion thereof, say, beside said guide means, on to which the stick carried on the cradle rolls under gravity. The cradle is tilted sideways towards the guide means in order to initiate this rolling under gravity, and restraining means such as a guard plate are provided to prevent the stick escaping from the cradle when the latter is not beside the guide means. Restraining means such as a guard plate rigid with the cradle prevent the sticks escaping from the table as the cradle describes its swinging motion.

The system hereinbefore described is included in the scope of the present invention. It preferably operates automatically, with cradle motion being initiated (by means of an electric contact switch for instance) when the rear of the stick sliding along the sloping guide means has passed a preset limit.

The description which follows with reference to the accompanying non-limitative exemplary drawings will give a clear understanding of the various features of the invention and of the manner of carrying them into practice.

In the drawings:

FIGURE 1 shows in side elevation a machine for mechanically separating container capsules;

FIGURE 2 is a plan view of the machine of FIGURE 1, looking on the arrow II;

FIGURES 3 and 4 are fragmental sections taken through the lines III—III and IV—IV of FIGURE 1;

FIGURE 5 is a longitudinal sectional view on an enlarged scale of the gripping head according to the invention; and FIGURE 6 is a corresponding view to FIGURE 5, showing an alternative form of embodiment of the gripping head.

The machine shown in the accompanying drawings includes a feed system 1 which successively positions, at 2, on an inclined chute 3, capsule sticks 2b carried on a table 4, a separating device 5 for disengaging individual capsules from the stick 2 and a discharge device 6 for positioning the disengaged capsules one by one upon an inclined slab 7 extending up to the utilization station.

Chute 3 is slidably mounted on a support 8 and is provided with two threaded rods 3a which pass through slots 8a in said support, being securely locked in position therein by nuts 8b, whereby the longitudinal position of chute 3 can be adjusted on support 8. Support 8 is in turn mounted on the machine stand 9 by means of threaded rods 10 cooperating with nuts 10a, thereby to permit vertical adjustment of chute 3 in relation to stand 9.

The feed system includes a cradle 11 pivotally mounted between table 4 and chute 3 through the agency of a horizontal shaft 11a which is fast with cradle 11 and rotatable in a bearing 12 mounted on table 4 at the point of intersection of table 4 and sloping chute 3. Shaft 11a is fast with a lever 11b which is operable via its tip by a pneumatic actuator 13. As will be explained hereinafter, actuator 13 may be so activated as to cause cradle 11 to swing between the horizontal position parallel with table 4, as illustrated, and an inclined position in which it is parallel to chute 3.

Table 4 is tilted slightly towards cradle 11, so that in the former of said positions, the first stick 2a of a row of capsule sticks 2b placed on the table rolls into cradle 11. Cradle 11 is in turn tilted towards the left of FIGURE 4, so that when it is positioned parallel beside chute 3, stick 2a rolls into position 2c on the chute. The feed system further includes a fixed sector-shaped guard plate 14 which prevents stick 2a from rolling off cradle 11 when the same is located in the lowermost position illustrated, and a further sector-shaped guard plate 15 rigid with the cradle for preventing the sticks 2b from rolling off the table as cradle 11 swings upwardly.

The stick of capsule 2 placed on sloping chute 3 slides down under gravity, and the first capsule 16 abuts against a retractable stop 17. The separating device consists basically of a gripping head 18 which upon completion of its forward stroke grips the first capsule 16 at the same time as stop 17 retracts and pressing means 19 move into pressure contact with the subsequent capsules 20 of the stick, and which then describes its return stroke while rotating about its axis, carrying the capsule 16 with it up to the end of its stroke. The capsule is then extracted from the gripping head and routed towards the utilization station along slab 7, as will be explained hereinafter. Gripping head 18 is driven in a to-and-fro motion by a sliding block 21 sliding on machine stand 9. Adjustment means 10–10a and 8a–8b permit precise adjustment of the position of chute 3, respectively in the vertical sense so that the axis of stick 2 coincides with the axis of gripping head 18 as it moves to-and-fro, and in the longitudinal sense so that the forward edge 3b of chute 3 is located at a distance from stop 17 slightly greater than the length l of one capsule. This distance may be set, for example, so that it is about one millimetre greater than the length l.

Reference is now had to FIGURE 5 for a detailed illustration of the gripping head, which comprises a cylindrical casing 22 mounted ahead of a sleeve 23, which is in turn rotatably mounted in a bearing 21a of slide block 21. An extractor rod 24 is axially slidable through sleeve 23. Mounted within cylindrical casing 22 is a rubber diaphragm 25, an annular compression chamber 25a being formed between said diaphragm and said casing. A union 26 is connected, through a flexible line 26a and a valve (not shown), to a compressed air source and has port in chamber 25a through casing 22, so that when said valve is open the air pressure in annular chamber 25a deforms diaphragm 25 inwardly. This elastic deformation is limited by a wire wound into the form of a coil spring 27 the diameter of which is somewhat greater than the diameter of capsule 16. When gripping head 18 reaches the end of its forward stroke, the helical abutting means 27 engages over capsule 16. Compressed air pressure is then caused to build up in annular chamber 25a, whereby diaphragm 25 distends inwardly, between the turns of coiled abutment means 27, and grips the wall of capsule 16. Abutting means 27 are designed to limit the pressure exerted by diaphragm 25 on capsule 16 to avoid distorting the latter. In the upper half of FIGURE 5, diaphragm 25 is shown as being non-deformed whereas it is shown as being deformed and pressing against capsule 16 in the lower half of FIGURE 5.

The rear of the forward cavity in head 18 is bounded by an extraction plate 24a fast with sliding rod 24. Rod 24 is fitted at its rear end with a collar 24b and urged rearwardly by a spring 24c compressed between collar 24b and the rear end-section of sleeve 23. Slightly before the end of the rearward stroke of head 18, the rear end of rod 24 contacts a stop 28 (see FIGURE 1) adjustable by means of a screw 28a. Since the pressure has already been released in annular chamber 25a and diaphragm 25 is therefore no longer pressing on capsule 16, the latter will be thrust out of the forward cavity in head 18 as the latter moves a little further to complete its rearward stroke.

Motive power for the machine is provided by a motor 29 which through a belt 29a drives the input pulley 30a of a reduction gear 30 of which the output pinion 30b meshes with a pinion 31a to drive a shaft 31 which in turn carries a crank-web 32 on one end and has its other end driving a camshaft 33 through a bevel coupling 33a.

Crank-web 32 is effective in imparting a to-and-fro motion to slide block 21 via a connecting rod 32a. Camshaft 33 carries four cams 34, 35, 36, 39 for controlling the other motions of the machine.

Through a lever 34a fulcrumed at 34b and a slide 34c, cam 34 controls stick 2 restraining motion while the first capsule 16 is being disengaged. As FIGURE 3 clearly shows, cam 34 actuates one end of lever 34a of which the other end causes corresponding upward and downward motion of slide 34c carrying pressing means on its end. The latter consists of a semi-cylindrical shell lined internally with rubber, so that when slide 34c is in the bottom position pressing means 19 presses against stick 2 in order to retain it against the chute 3 and prevent it from shifting longitudinally as the gripping head 18 disengages the first capsule 16. Pressing means 19 is linked to slide 34c through the medium of a screw and nut adjustment device 19b which permits of adjusting the pressure exerted on the stick when the pressing means is in the bottom position, in order to avoid damaging the capsules. Pressing means 19, controlled by cam 34, rises when gripping head 18 has moved back again with a capsule 16 and retractable stop 17 has returned to the bottom position, and then descends in order to restrain stick 2 until stop 17 retracts to let through the gripping head 18 in its subsequent forward motion.

The movement of stop 17 is similarly controlled by cam 35 which operates via a lever 35a fulcrumed at 35b and a slide 35c which raises and lowers the stop 17.

Cam 36 rotates gripping head 18 when the same has reached the end of its forward travel. The rotation is imparted through a lever 37 fulcrumed at 37a and a connecting rod 38. Rod 38 is ball-and-socket jointed as at 38a to the end of lever 37, and as at 38b to the rear of gripping head sleeve 23. Cam 36 is contoured to impart the following motions: lever 37 rotates slightly during forward motion of sliding block 21 in order that gripping head 18 should not rotate therein; when sliding block 21 has reached the end of its forward travel and compressed air has been flowed into gripping head 18 whereby to grip capsule 16, cam 36 suddenly rotates lever 37 in order that an abrupt rotating motion in the direction of arrow F should be imparted to the gripping head via rod 38, thereby helping to disengage capsule 16. Cam 36 then rotates lever 37 in the opposite direction until rod 38 causes gripping head 18 to revert to the angular position it occupied previously. During the remainder of the return motion of sliding block 21, cam 36 continues to rotate lever 37 slowly so as to maintain head 18 in that angular position.

Cam 39 controls the valve (not shown) which flows compressed air into gripping head 18. Cam 39 is so contoured that said valve opens to admit compressed air into gripping head annular chamber 25a when head 18 has reached its limit forward travel and just before its abrupt rotating motion begins, thereby to enable diaphragm 25 to grip capsule 16, as explained precedingly. Closure of said valve, in order to vent annular chamber 25a, and thus release capsule 16, takes place a little before the rear end of extractor rod 24 contacts stop 28.

Upon being driven out thus from the forward cavity of gripping head 18 by extractor 24, 24a, capsule 16 drops through a small height at 16a, into a trough 40. In the course of the next forward motion, a catch 41 fixed to the housing 21a of sliding block 21 thrusts the capsule into trough 40 until completion of the forward movement of said slide block. Catch 41 then occupies the position shown in broken lines at 41a in FIGURE 1. Ahead of position 41a, trough 40 forms a platform on to which the capsule topples, and its side wall is interrupted by an opening enabling the capsule located on the platform to roll onto inclined slab 7 which leads to the capsule utilization station. However, a further catch 42, likewise fixed to housing 21a masks this opening when slide block 21 has reached the end of its forward travel and catch 42 occupies the position shown in broken lines at 42a. The capsule is thus retained on the platform by catch 42 so long as slide block 21 has not moved back through a certain distance, whereupon the capsule can leave the platform and roll along slab 7 without any danger of being snagged by the parts which are fixedly secured to slide block 21 and continue their rearward motion.

Alternatively, a different arrangement (not shown) may be used in which catch 42 is rigid with slide 34c instead of housing 21a. When slide 34c is at the bottom (capsule stick clamped), catch 42 partly masks the entrance to downleading slab 7. The capsule fetched on to the platform by catch 41 is left waiting. When slide 34c rises again, it carries with it catch 42, thus clearing the way for the capsule to roll along inclined slab 7.

In operation, the machine causes gripping head 18 to move up to the first capsule 16 of stick 2 and to disengage it as previously explained by rotating it and pulling it backwards while the rest of the stick is held securely by pressing means 19. Gripping head 18 then carries capsule 16 with it up to the end of its rearward travel, where the capsule is expelled by extractor 24 and drops into trough 40. Head 18 then moves the capsule forward in the trough as it returns to pick up the second capsule which has taken the place of capsule 16 against stop 17 (stick 2 having slipped downwardly in chute 3). Gripping head 18 then disengages this second capsule as it moves back and at the same time allows the first capsule to roll on to slab 7, and so on.

When the last capsule on stick 2 has moved beyond a microswitch 43 mounted on chute 3 (see FIGURE 2), said microswitch activates the actuator 13, which in turn causes cradle 11 to swing as previously explained, whereby a second stick 2c is discharged into chute 3 and slides down it under gravity until it engages into the first stick 2. Actuator 13 then fetches cradle 11 into the horizontal position, in which position it receives under gravity the next stick 2b positioned on table 4, and so on.

It is to be noted that the subject machine of the invention can be adapted to suit a variety of capsule dimensions merely by adjusting the vertical and longitudinal positions of chute 3 by means of 10, 10a and 8a, 8b provided for the purpose, and by adjusting the position of pressing means 19 by means of device 19b. Indeed, the stroke of slide block 21 is always the same, so that position 41a of catch 41 is also invariably the same and the extracted capsules are always brought into the same position, regardless of their length, and will therefore be able to roll along inclined slab 7.

Reference is now had to FIGURE 6 for an alternative form of embodiment of the gripping head, in which the inner elastic wall of the head in its inoperative configuration has a volume slightly less than that of the capsule whereby to exert thereon a light pressure insufficient to damage it, but without the need to provide means such as the coiled wire 27 to limit this pressure. The elastic wall is caused to separate from the capsule by a negative pressure, so that the function of cam 39 is to place gripping head in communication with a vacuum source rather than with a compressed air source.

The gripping head shown in FIGURE 6 includes a steel bush 44 the forward bore of which is formed with a helical groove 45 therein and the rear portion of which is formed with an opening 46 for extension therethrough of an extractor similar to extractor 24, 24a of FIGURE 5. A hole 46a extending into the forward bore is fitted with a union through which said bore communicates with the vacuum source. Two threaded holes 47 serve to fix bush 44 to an arm which moves the same to-and-fro and rotatingly as in the form of embodiment described precedingly.

Into bush 44 is inserted an externally cylindrical rubber sleeve 48 of length suited to the type of capsule and formed with an inner bore 45a of conicity matching that of the capsule. Sleeve 48 is formed with a front rim 48b adapted to receive a metal ring 49 which locates the rim 48b on sleeve 48 and is secured thereto as at 50 by means of three screws mutually spaced angularly at 120°.

Sleeve 48 clamps the capsule in the inoperative state. Then as the gripping head moves towards a capsule stick, cam 39 evacuates the space 51 included between bush 44, ring 49 and sleeve 48, whereby sleeve 48 is caused to hug the wall of the forward bore formed in said bush, responsively to the negative pressure distributed by helical groove 45. When the gripping head reaches the end of its forward stroke, the vacuum is destroyed by cam 39, whereupon rubber sleeve 48 clamps on to the capsule ready to disengage the same. The gripping head then has a rotating movement imparted to it which facilitates disengagement. A vacuum is created once more as the head moves rearwardly, a little before the extractor moves into abutment.

It goes without saying that many changes and substitutions of parts could be made to the specific forms of embodiment hereinbefore described for exemplary purposes, without departing from either the spirit or the scope of the invention. In particular, instead of clamping the capsules by an inward pressure exerted from the outside, the gripping head could take up the capsules the other way round, that is to say that the first capsule in the stick would be offered up with its opening facing the gripping head, which gripping head would then grip the capsules by an internal expanding effect.

What is claimed is:
1. A device for separating a first capsule from an assembly of stoppering and capping capsules fitted in one another to form a stick, comprising a gripping head having deformable wall means including an elastic sleeve member adapted to be elastically expanded and constricted between a first position in which the deformable wall means is adapted to freely engage over or into the first capsule in said stick of capsules, and a second position in which the elastic sleeve member is adapted to be applied with limited pressure against the first capsule; releasable clamping means for expanding and constricting the sleeve member between the said first and second positions; means for controlling the releasable clamping means and for moving the gripping head whereby the deformable wall means is freely engageable over or into the first capsule with the sleeve member in the first position; means for controlling the releasable clamping means in the second position of said sleeve member to apply the sleeve member against the first capsule; means for restraining the second capsule in the stick thereof; and means for moving the gripping head away from the stick of capsules.

2. A device as claimed in claim 1, including means for at least initiating motions of said gripping head away from said stick and rotationally about the stick axis.

3. A device as claimed in claim 1, wherein the sleeve member is an elastic diaphragm and the deformable wall means includes abutting means therefor adapted to freely engage over or into the first capsule, between the peripheral wall thereof and said diaphragm, while at the same time covering portions of said peripheral wall, said diaphragm being adapted to be deformed by said releasable clamping means whereby to hug those portions of said peripheral wall which are not covered by said abutting means.

4. A device as claimed in claim 3, wherein said abutting means is a length of wire coiled into a helix.

5. A device as claimed in claim 3, wherein said gripping head includes a chamber bounded by said elastic diaphragm, and said releasable clamping means include means for supplying pressurized fluid to said chamber and means for releasing the pressure created by said fluid.

6. A device as claimed in claim 1, wherein the elastic sleeve member is adapted when at rest to elastically hug the first capsule and wherein the releasable clamping means include means for so deforming said sleeve member as to enable it to freely engage over or into the first capsule.

7. A device as claimed in claim 6, wherein the elastic sleeve member forms a wall of a chamber in said gripping head and wherein said releasable clamping means include means for freely venting said chamber and means for evacuating the same.

8. Apparatus for mechanically separating stoppering capsules and capping capsules fitted into one another to form a stick, comprising:
  (a) means for offering up the stick in a specific position with the first capsule therein oriented in a specific sense;
  (b) a gripping head having deformable wall means including an elastic sleeve member adapted to freely engage over or into the first capsule;
  (c) a mechanism comprising means for imparting to said gripping head a back and forth motion which includes a forward motion wherein said gripping head is fetched into a position in which said deformable wall means freely engage over or into the first capsule, and a rearward motion wherein said gripping head moves away from said stick, and means for imparting to said gripping head, at the start of each rearward motion at least, a twisting motion about the stick axis;
  (d) releasable clamping means in said gripping head, adapted to deform said elastic sleeve member freely engaging over or into the first capsule, whereby to apply at least partly said elastic sleeve member against the first capsule with limited pressure and thereby render said capsule fast with said gripping head;
  (e) releasable restraining means for restraining the second capsule in the stick thereof, at least at the beginning of each rearward motion;
  (f) control means for operating said releasable clamping means whereby to make the first capsule fast with said gripping head at the start of each rearward motion at least, and for releasing said releasable clamping means before the end of each rearward motion at least; and
  (g) extraction means for disengaging from said gripping head the capsule located therein at the end of each of said rearward motions.

9. Apparatus as claimed in claim 8, wherein said mechanism includes means for imparting back and forth motion to a slide block (21) having a gripping head (18) slidably mounted therein, and means for rotating a cam member (36) which cooperates with a lever (37) connected to said gripping head through a ball-and-socket-jointed connecting rod (38), said cam member being so contoured that said gripping head be caused to rotate abruptly on reaching the end of its forward motion.

10. Apparatus as claimed in claim 9, wherein said mechanism includes means for rotating a second cam member (39) adapted to operate control means for making the first capsule fast with said gripping head at the end of the forward motion thereof and before cam member (36) abruptly rotates said gripping head and for releasing said releasable clamping means at least before the end of each rearward motion.

11. Apparatus as claimed in claim 10, wherein said releasable clamping means include chamber means (25a or 51) selectively feedable with pressurized fluid whereby to releasably deform said deformable wall means, and wherein said control means include means for supplying said chamber means with pressurized fluid, said means being adapted to be operated by cam member (39) and including flexible pipe means leading into said chamber means.

12. Apparatus as claimed in claim 10, wherein the means for offering up the stick include a stick chute (3) and a retractable stop (17) for the first capsule, said releasable restraining means include pressing means (19) adapted to press the second capsule on to said chute with limited pressure, and said mechanism includes means for rotating third and fourth cam members (34 and 35) respectively adapted to actuate, before the end of each forward motion of said gripping head, firstly said pressing member (19) whereby to press the second capsule on to chute (3) and subsequently the retractable stop (17) whereby to retract the same.

13. Apparatus as claimed in claim 8, wherein said extraction means include a member (24) slidably mounted in said gripping head and adapted to abut against a stationary part before the end of each rearward motion whereby to slide through said gripping head and thereby expel the capsule therefrom.

References Cited

UNITED STATES PATENTS

| | | | |
|---|---|---|---|
| 1,657,879 | 1/1928 | Carle | 221—40 |
| 1,990,148 | 2/1935 | Tevander | 221—220 X |
| 3,083,868 | 11/1963 | Mueller | 221—262 X |

SAMUEL F. COLEMAN, *Primary Examiner.*